W. W. EATON.
RULER.
APPLICATION FILED SEPT. 18, 1919.
1,334,145.
Patented Mar. 16, 1920.
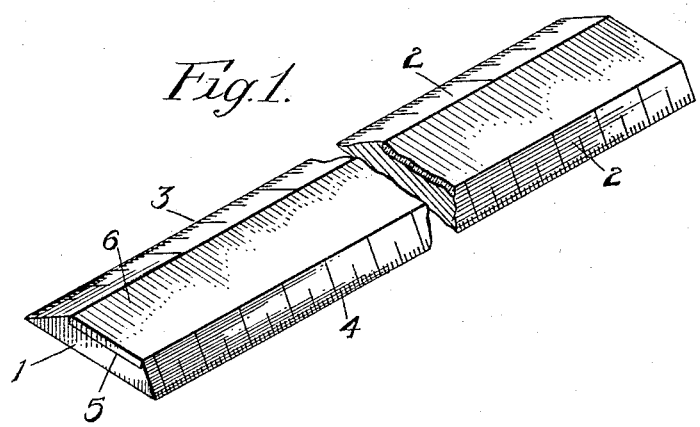
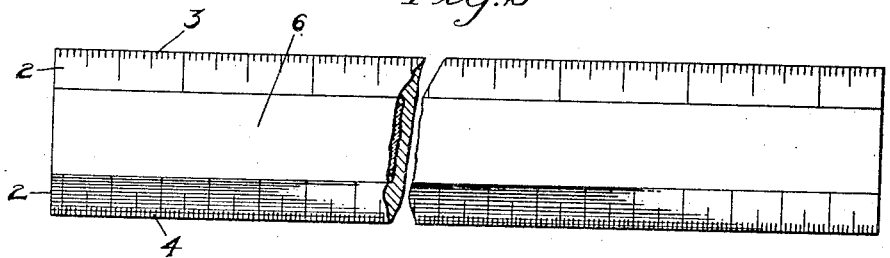
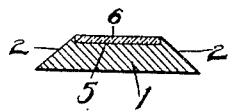
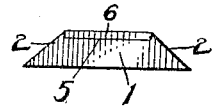
WITNESSES
Fred Frederick
S. W. Foster
INVENTOR
William W. Eaton.
BY
ATTORNEYS

UNITED STATES PATENT OFFICE.

WILLIAM W. EATON, OF BAYONNE, NEW JERSEY.

RULER.

1,334,145.

Specification of Letters Patent. Patented Mar. 16, 1920.

Application filed September 18, 1919. Serial No. 324,372.

*To all whom it may concern:*

Be it known that I, WILLIAM W. EATON, a citizen of the United States, and a resident of the city of Bayonne, in the county of Hudson and State of New Jersey, have invented a new and Improved Ruler, of which the following is a full, clear, and exact description.

This invention relates to improvements in rulers, an object of the invention being to provide a ruler with a longitudinal space thereon which is adapted to receive numerals registering with the scales, which numerals can afterward be erased or otherwise removed.

A further object is to provide a ruler having scales on its edges similar to the scales of plotting paper but without numerals on the division marks of the scales, and make provision on the ruler so that the division marks may be numbered according to the needs of the user at the moment, and afterward removed.

With these and other objects in view, the invention consists in certain novel features of construction and combinations and arrangements of parts as will be more fully hereinafter described and pointed out in the claims.

In the accompanying drawings:—

Figure 1 is a broken perspective view illustrating my improved ruler.

Fig. 2 is a broken plan view.

Fig. 3 is a view in transverse section.

Fig. 4 is an end view.

1 represents my improved ruler, which may be of any desired material having beveled edges 2. One edge contains division marks forming a scale 3 measuring inches and twentieths thereof, and on the other beveled edge a scale 4 is provided, graduated in centimeters and millimeters, these being the usual scales of plotting paper.

The ruler at its top is provided with a longitudinal recess 5, in which a strip 6 of celluloid, ground glass, stone, slate or other material which will readily take pencil marks, is provided. The material must be such as will also permit the removal of the pencil mark by a wet cloth, eraser or other readily accessible means.

The use of such a scale, particularly in plotting curves is obvious. The proper numbering for the abscissa is written in pencil on the strip, the scale is then placed parallel to the X-axis, at different ordinates as desired and the points plotted by reading along the ruler. This obviates the necessity of following with the eye both the X and the Y line, and avoids the confusion and inaccuracy resulting therefrom.

Various slight changes might be made in the general form of the parts described without departing from my invention, and hence I do not limit myself to the precise details set forth, but consider myself at liberty to make such slight changes and alterations as fairly fall within the spirit and scope of the appended claims.

I claim:—

1. A ruler, having at one edge an unnumbered scale and having a longitudinal recess in its upper face with the edge of said recess closely adjacent to said scale, and a strip of material in said recess adapted to receive numerals thereon and being of such nature as to permit the easy erasure of said numerals.

2. A ruler having unnumbered scales at its edges, and having a longitudinal recess in its upper face with the sides of said recess closely adjacent to said scales, and a strip of material in said recess adapted to receive numerals thereon and being of such nature as to permit the easy erasure of said numerals.

WILLIAM W. EATON.